2,735,875
Patented Feb. 21, 1956

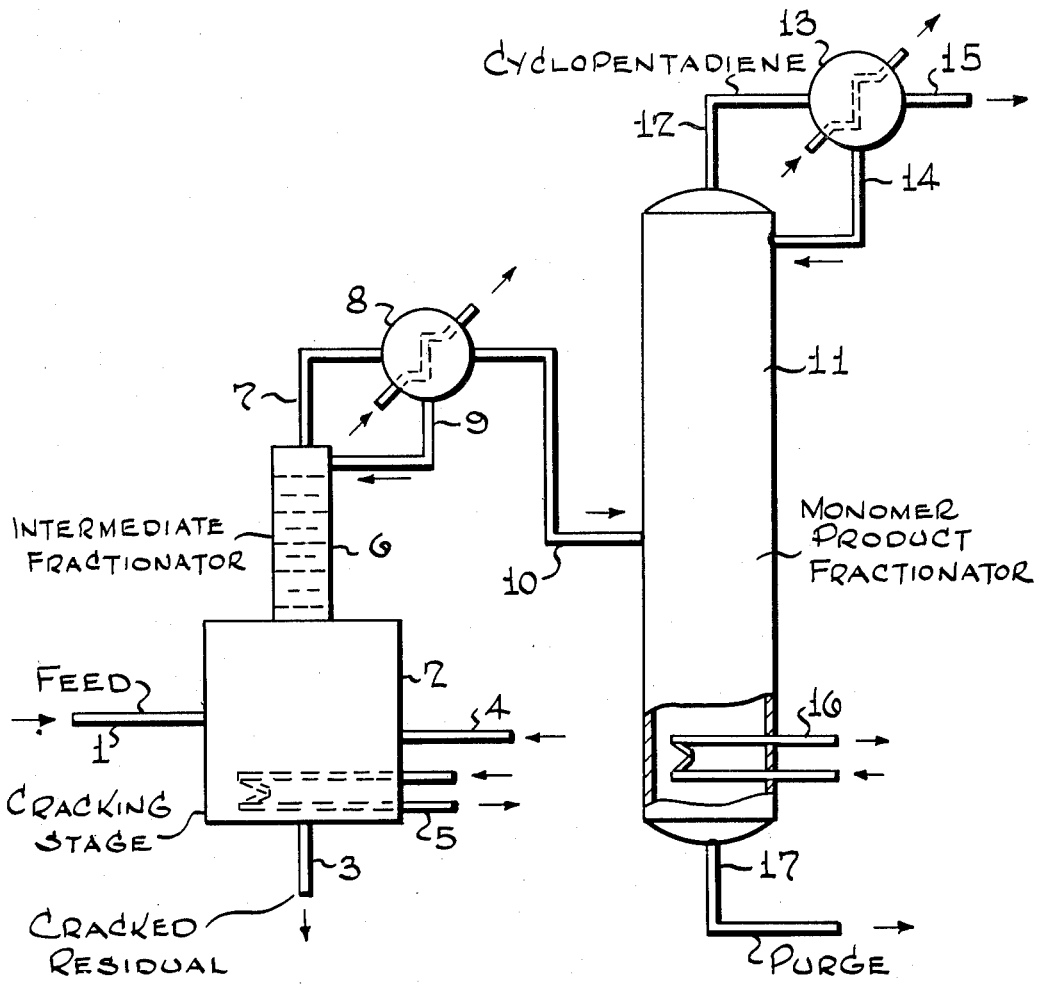

2,735,875

PROCESS FOR RECOVERY OF CYCLOALKADIENE MONOMERS FROM THEIR DIMERS

Addison W. Hubbard, Elizabeth, Fred W. Banes, Westfield, and John F. Johnson, Highland Park, N. J., assignors to Esso Research and Engineering Company, a corporation of Delaware Application June 18, 1952, Serial No. 294,161

4 Claims. (Cl. 260—666)

This invention relates particularly to a continuous process for obtaining high purity cyclopentadiene and methyl cyclopentadiene monomers from their crude dimer concentrates.

The crude dimer concentrates are characterized by concentrations of $C_{10}$ to $C_{12}$ dimers and codimers of cyclopentadiene and methyl cyclopentadiene in the range of about 20 to 90%, and the presence of other hydrocarbons in the $C_7$ to $C_{14}$ range, including dimers of $C_7$ cycloalkadienes. The dimer concentrate feed should be as free as possible of $C_7$ and lower hydrocarbons to avoid contamination of the final $C_5$ and $C_6$ cycloalkadiene monomer products to be recovered. Of course, some $C_5$ to $C_7$ acyclic dienes and some $C_7$ cycloalkadienes tend to be present in the dimer concentrates on account of the unavoidable presence of dimers and codimers of these compounds in a concentrate of $C_{10}$ to $C_{12}$ dimers of cyclopentadiene and methyl cyclopentadiene.

Significantly improved recovery of the monomers has now been obtained by use of an intermediate fractionation between a zone where the dimers are cracked and a monomer product fractionating zone where the desired monomers are separated from higher-boiling hydrocarbons.

The intermediate fractionation zone can be advantageously located so as to receive the hot vapors directly from the cracking zone and bring about the removal of vaporized dimers from the monomer vapor stream. It can also be arranged, if desired, to condense the cracking zone vapors and feed them to the intermediate fractionation zone as liquid.

The purpose of the intermediate fractionation is to prevent the $C_{10}$ to $C_{12}$ cycloalkadiene dimers, insofar as practical, from entering the subsequent monomer product fractionator with the cracking zone monomer vapors. The liquid condensate from the intermediate fractionation zone can be returned directly to the cracking zone wherein suitably high cracking temperatures are maintained more effectively.

Remarkably improved recovery of the desired monomers is obtained by use of the intermediate fractionator without recycling bottoms products from the monomer product fractionator.

The flow diagram in the drawing illustrates a general arrangement of apparatus which may be used in the preferred embodiment of the invention.

Referring to the drawing, numeral 1 represents an initial feed of the cyclodiene dimer concentrate to a cracking vessel 2. Other cracking stages in series may be used to further crack residual liquid withdrawn from vessel 2 by line 3. The vapors from subsequent stages may be returned to vessel 2 by line 4 or may be subjected to similar intermediate fractionation in separate zones. The cracking vessel 2 may be equipped with a suitable heating device, such as a heat exchange coil 5.

The intermediate fractionator 6 is directly connected to the upper part of cracking vessel 2. It is preferably superimposed on the cracking vessel 2 as shown, or it may be otherwise closely connected thereto in order to directly receive the vapors generated in the cracking vessel at close to their cracking temperatures or to receive a liquid feed of condensed cracking zone vapors.

The intermediate fractionator 6 may be provided with conventional vapor-liquid contacting means, such as bubble plates, packing etc., but is preferably equipped with as few plates or their equivalent as necessary for the fractionation with a minimum of hold up, for example, the intermediate fractionator may be equipped to give the effect of only about 2 to 6 theoretical plates to the vapors passing therethrough in bringing the temperature of the vapors down to below 125° C. (257° F.).

The reflux bottoms of the intermediate fractionator 6, substantially free of $C_7$ and lower hydrocarbons, and principally containing condensed $C_{10}$ to $C_{12}$ dimers with close-boiling hydrocarbons is returned to the cracking zone.

The vapors withdrawn overhead from fractionator 6 by line 7 may then be passed into a cooling and condensing zone 8 for control of the temperature and to supply reflux of condensate through line 9 to the upper part of fractionator 6. The remaining vapor stream containing the $C_5$ and $C_6$ alkadiene monomers will be in admixture with other hydrocarbons that are mainly $C_7$ and $C_8$ and as free as practical of hydrocarbons above $C_9$. This vapor stream is passed by line 10 into an intermediate part of the monomer product fractionator 11. Fractionator 11 may be equipped with fractionating means to give the equivalent of about 3 to 10 theoretical plates above and 3 to 10 plates below the feed inlet in order to satisfactorily distill overhead substantially all the cyclopentadiene monomer or to distill overhead all the cyclopentadiene and methyl cyclopentadiene monomers and thereby to recover a high purity distillate of these monomers. The overhead vapors are withdrawn from product fractionator 11 by line 12 to a cooling condenser 13 from which some reflux may be provided for return by line 14 to the upper part of the monomer product fractionator 11. The remaining distillate is withdrawn by line 15 to be stored or further processed as desired.

The present invention is not concerned with the subsequent treatments of the monomer products. They may be subjected to soaking treatments for redimerizing and they may also be subjected to further distillation to obtain a further separation between the monomers.

Column 11 is equipped with any suitable heating means or reboiling means for supplying the necessary heat, for example, the reboiler heating coil 16. The bottoms products are withdrawn from fractionator 11 by line 17. This bottoms product will contain the hydrocarbons higher boiling than the distilled cycloalkadiene monomers, e. g. $C_7$–$C_9$ hydrocarbons carried in the stream of the feed to fractionator 11 and in addition, dimers which tend to be formed in the fractionating column 11. To an appreciable extent, the dimers present in this bottoms product may be the dimers of $C_7$ cycloalkadienes and purging of these substances with the $C_7$–$C_9$ hydrocarbons is of great benefit.

In earlier developments, vapors from the dimer concentrate cracking stage were sent directly to the monomer product fractionator, such as represented by fractionator 11. Then to avoid tremendous loss of the cyclodienes as dimers in the bottoms from this fractionator, it was found necessary to recycle as much as possible the bottoms product from the product fractionator to the cracking zone, even though such bottoms would include $C_8$ and lower hydrocarbons, also dimers and codimers of hydrocarbons that contaminate the desired products.

In accordance with the present invention, there is the reverse requirement that the bottoms product from the product fractionator 11 should be kept from recycling to the cracking zone to obtain thereby the improved results.

It is to be understood that the term "purging" is used herein to mean removal of a material from the system so that the purged material is prevented from returning to preceding zones in the system described.

The intermediate fractionation of the vapors from the cracking zone, properly operated to prevent dimers or $C_{10}+$ hydrocarbons in the cracking zone overhead vapors from passing to the product fractionator, serves to improve the cracking operation and to prevent loss of dimers in the bottoms purged from the product fractionator.

The effect of the cracking temperature in the cracking stages on the amount of the cyclopentadiene and methyl cyclopentadiene monomers recovered is very important as illustrated by the following data:

TABLE I

*Effect of cracking temperature in systems with varied amounts of intermediate fractionation on the same feed stock material*

| Cracking Temperature, °C. | | Wt. percent Overhead Products from Monomer Product Fractionation (Based on Feed) | Percent Recovery of Cyclopentadiene and Methyl Cyclopentadiene Monomers |
| --- | --- | --- | --- |
| 1st stage | 2nd stage | | |
| 177 | 190 | 43.8 | 59.3 |
| 185 | 195 | 53.3 | 72.3 |
| 195 | 205 | 59.3 | 80.4 |
| 205 | 215 | 61.6 | 83.5 |

It can be readily seen from the data in Table I that by increasing the temperature in the cracking stages a substantially better recovery of the cyclodiene monomers is obtained. Thus, it was found important to be able to operate the liquid phase cracking stages at the elevated temperatures of the order of 190° C. to 230° C. The intermediate fractionation, operated to directly separate and reflux the $C_{10}$ dimers and higher-boiling materials or $C_9+$ hydrocarbons and allow the $C_7$ and $C_8$ inerts to pass with the monomers to the product fractionator eliminates the need of recycling substantial amounts of the light hydrocarbons such as $C_7$ to $C_9$ hydrocarbons with dimers to the cracking zone so that the cracking temperature can be maintained at the optimum elevated temperatures. Since substantially no dimers of the cyclodienes are fed into the product fractionator, the only dimer material lost in the bottoms of this fractionator is that formed in the product fractionator. This loss can be reduced to a nominal value by proper design of the product fractionator. By virtue of the intermediate fractionation, higher monomer recoveries up to 90% can be obtained with no recycle of the bottoms from the product fractionator. This is demonstrated in the following example:

EXAMPLE 1

An intermediate fractionator was mounted over a first cracking stage as shown in the drawing. The fractionator was equipped to give the effect of up to 5 theoretical plates and had a vapor dividing head arranged to condense and reflux part of the overhead vapors while passing the remaining vapors directly to the intermediate part of the product fractionator.

The overhead vapor temperatures from this intermediate fractionator were held at about 106° C. by refluxing 2 parts of the overhead vapors per each one part forwarded to the product fractionator.

The following analytical results are representative of those obtained with this kind of operation:

TABLE II

| | Wt. per cent |
| --- | --- |
| Wt. per cent feed passed to monomer product fractionator | 83.5 |
| Composition of monomer product fractionator feed: | |
| Cyclopentadiene | 40.4 |
| Methylcyclopentadiene | 35.6 |
| $C_7$ cyclodienes | 6.8 |
| $C_5$ acyclic dienes | 6.2 |
| Dimers or codimers | 3.0 |
| Other $C_7-C_9$ fill material | 8.0 |
| Wt. per cent cyclopentadiene and methylcyclopentadiene monomers [1] | 88.0 |
| Wt. per cent total cyclopentadiene and methylcyclopentadiene removed from cracking stage | 91.4 |

[1] Based on 72.3 weight per cent cyclopentadiene and methyl cyclopentadiene in initial feed.

The results in Table II are interesting in showing the low amount of dimers and codimers which remain in the monomer vapor stream fed to the monomer product fractionator where 88 weight per cent of the cyclodiene monomers are found in the intermediate fractionator overhead product. If the intermediate fractionation were omitted the vapor feed from the cracking stages to the monomer product fractionator would contain about 20 to 30 weight per cent of the dimers and codimers while operating the cracking stages at similar high temperatures. With such large amounts of dimers and codimers passed into the monomer product fractionator there would be a very low monomer recovery unless prohibitively large quantities of the bottoms product from the monomer product fractionator are recycled to the cracking stages, which, in turn, results in lowered operating temperatures in the cracking zone through the build-up of low-boiling fill material.

Another interesting observation illustrated in Table II is that with the proper intermediate fractionation certain amounts of the $C_7$ cyclodienes are continuously removed from the cracking stage to the monomer product fractionator and can be segregated in the bottoms fraction purged from the monomer product fractionator. To some extent these $C_7$ cyclic dienes are polymerized in the bottom or reboiling section of the monomer product fractionator. It is desirable to avoid recycling of these dimers of the $C_7$ cyclic diolefins back to the cracking stages where they would have an opportunity to build up in concentration adversely to the recovery of the $C_5$ and $C_6$ cyclodienes.

The use of the intermediate fractionator to prevent $C_{10}$ dimers and higher boiling hydrocarbons from being carried by the monomer vapor product stream to the monomer product fractionator has been explained.

The invention is not limited in any way by the construction of the intermediate fractionator or its auxiliary parts. It may be in the convenient form of a packed or plate column which need not be very large. Advantageously, it receives the freshly formed cracking zone vapors nearer at the bottom where the vapors are at temperatures in the range of 190° C. to 230° C. (380° F. to 446° F.). The reflux system for this intermediate fractionator may comprise a partial condenser or an external condenser or similar liquid knock-out drums and means to return the liquid condensate to an upper part of the column. This intermediate fractionating column operates satisfactorily even with its overhead vapor temperatures maintained over a wide range of temperatures, e. g. from 90 to 125° C., but preferably with the overhead temperature in the range of 90° to 110° C.

The important requirement of the intermediate fractionation is to eliminate $C_{10}$ and higher boiling hydrocarbons, and essentially the dimers from the monomer vapor stream being passed to the monomer product fractionator. This intermediate fractionation may be used with any number of liquid phase cracking stages, although economically 1 to 2 stages may be most desirable. The intermediate fractionating means may be used over any or all of the cracking stages although it may prove economical and desirable to have the vapors from all stages feed to a common intermediate fractionator. It is also possible to contact the vapors from each stage with liquid undergoing cracking in a previous stage for enrichment purposes.

Furthermore, the vapors from any or all of the cracking stages may be brought into contact with fresh feed as these vapors are sent to or through the intermediate fractionator, and thereby low boiling components of the feed are directly vaporized and withdrawn with the monomer vapors.

The purpose of the monomer product fractionator, 11, is to separate the cyclopentadiene monomer as a distinct product or a mixture of cyclopentadiene monomer with methylcyclopentadiene monomer. It is desirable that these monomers be separated as completely as possible from other close-boiling and higher-boiling components, e. g. $C_7$ cyclodienes, also other $C_7$–$C_9$ hydrocarbons which may be present in the feed to this column. It has been found that this separation can be accomplished with a column having about 3 to 10 theoretical plates in the enriching or upper rectification section and about 2 to 10 plates in the stripping section below the feed inlet. The data shown in Table II resulted from using 6 plates above and 2 plates below the feed point. It should be recognized that the variables of number of plates, reflux ratio, overhead temperature, and reboiling can be varied to change the degree of recovery and purity of the cyclopentadiene and methylcyclopentadiene products. In general, the column size and reflux ratio are kept as low as possible for economy, the limiting factor being the desired purity and recovery of the monomer products.

Suitable top vapor temperatures in this monomer product fractionator are in the range of 41° C.–73° C. depending on the purity desired of cyclopentadiene per se or mixed with methyl cyclopentadiene. Suitable bottoms or reboiler temperatures for effecting distillation in fractionator 11 are in the range of 110° C. to 180° C.

TABLE III

*Effect of intermediate fractionation on monomer product recovery from monomer product fractionator*

| Operation, No. | 1 | 2 |
| --- | --- | --- |
| Description | Total Recycle No Interm. Fract. | No Recycle Interm. Fract. |
| Temp. in Crackers and Fractionations: | | |
| 1st Stage | 350° F. (177° C.) | 385° F. (196° C.). |
| 2nd Stage | 360° F. (182° C.) | 402° F. (205° C.). |
| Interm. Fract. Overhead | | 216° F. (102° C.). |
| Final Fract. Overhead | 154° F. (68° C.) | 154° F. (68° C.). |
| Feed to Final Fractionator, Wt. Percent of Fresh Feed. | 87.5 | 70.3. |
| Overhead Prod. from Final Fract., Wt. Percent of Fresh Feed. | 34.2 | 61.2. |
| Cyclodiene Content, Wt. Percent. | 94.0 | 93.5. |
| Recovery of Monomers, Wt. Percent of Fresh Feed. | 52.6 | 90.3. |
| Purge from Fract. Reboiler, Wt. Percent Fresh Feed. | 0 | 9.1. |
| Recycle to 1st Cracking Stage, Wt. Percent Fresh Feed. | 53.5 | 0. |
| Purge from 2nd Cracking Stage, Wt. Percent Fresh Feed. | 65.8 | 30.7. |
| Cyclodienes Lost in Purge Streams, Wt. Percent Fresh Feed. | 47.4 | 9.7. |

The column 2 operation under Table III made in accordance with the principles of the present invention indicates:

1. Superior recovery of monomer, 90.3% compared to 52.6% obtained without intermediate fractionation.
2. Advantage of higher temperatures in the cracking stages under the same pressure of about 1 atmosphere, i. e. a pressure adequately low to permit volatilization of some $C_{10}$ dimers with $C_5$ to $C_9$ hydrocarbons from the cracking zone.
3. The No. 1 operation using no intermediate fractionation results much higher loss of dimers removed with purged residue.

If operation No. 1, without intermediate fractionation is modified by reducing or eliminating recycle, adverse results are obtained. Recovery of the cyclodiene product is lowered. The final monomer product fractionator has a large amount of bottoms to be stripped free of the monomer product and these bottoms when purged (not recycled) will give a high loss of cyclodiene dimers.

Having described the invention it is claimed as follows:

1. In the cracking of cyclopentadiene dimer concentrate, the improvement which comprises passing cyclopentadiene monomer formed from said concentrate in a cracking zone with uncracked dimer with hydrocarbons in the $C_7$–$C_9$ range into an intermediate fractionation zone, maintaining conditions in said intermediate fractionation zone such as to condense vapors of the dimer and reflux the condensed dimer while monomer of the cyclopentadiene remains in vapor phase with hydrocarbons in the $C_7$–$C_9$ range; returning the reflux of the dimer to the cracking zone from said intermediate fractionation zone but retaining said $C_7$–$C_9$ hydrocarbons in a vapor stream from said intermediate fractionation zone to prevent their return with the reflux to the cracking zone, passing the remaining vapors containing cyclopentadiene monomer with hydrocarbons in the $C_7$–$C_9$ range to an intermediate part of monomer fractionating zone, condensing vapors of hydrocarbons in the $C_7$–$C_9$ range and hydrocarbons higher boiling than the cyclopentadiene monomer in said monomer product fractionation zone, withdrawing overhead monomer vapors from said product fractionation zone, and purging the resulting bottoms of the product-fractionation zone including the condensed hydrocarbons in the $C_7$–$C_9$ range.

2. In cracking dimers and codimers of cyclopentadiene and methylcyclopentadiene mixed with lower-boiling and higher-boiling hydrocarbons, the improvement which comprises cracking said dimers and codimers in liquid phase in a cracking zone at temperatures in the range of 190° C. to 230° C., passing cracked product vapors evolved in said cracking zone with vapors of said dimers and codimers into an intermediate fractionating zone, maintaining conditions in said intermediate fractionating zone such as to condense and reflux dimers and codimers with higher boiling hydrocarbons while remaining vapors containing monomers of cyclopentadiene and methylcyclopentadiene with $C_7$ to $C_9$ hydrocarbons are cooled to a temperature in the range of 90° to 125° C., retaining $C_7$ to $C_9$ hydrocarbons in the vapor phase stream from said intermediate zone to prevent their return with the reflux to said cracking zone, passing the remaining cooled vapors containing the monomers to a monomer product fractionating zone wherein $C_7$ and higher-boiling hydrocarbons are condensed, withdrawing monomer vapors overhead from said product fractionation zone, and purging the $C_7$ and higer-boiling hydrocarbons from said monomer product fractionating zone.

3. In the liquid phase cracking dimers of cyclopentadiene and methylcyclopentadiene in a concentrate containing other hydrocarbons close-boiling to the dimers but substantially free of $C_7$ and lower boiling hydrocarbons, the improvement which comprises cracking the dimers in said concentrate in liquid phase at temperatures in the range of 190° to 230° C., passing resulting vaporized products from said cracking zone containing cyclopentadiene monomer, methylcyclopentadiene monomer, said dimers, and close-boiling hydrocarbons into an intermediate fractionating zone, condensing and refluxing in said intermediate fractionation zone $C_{10}$ and higher-boiling hydrocarbons substantially freed of $C_7$ and lower-boiling hydrocarbons, returning residual reflux of the $C_{10}$ and higher-boiling hydrocarbons from the intermediate fractionating zone to the cracking zone, retaining $C_7$ to $C_9$ hydrocarbons in a vapor stream from said intermediate fractionation zone to prevent their return with said reflux to the cracking zone, passing $C_5$ to $C_9$ hydrocarbons including the monomers of cyclopentadiene and methylcyclopentadiene as a distillation product from the intermediate fractionation zone to a monomer product fractionating zone, distilling $C_5$ and $C_6$ monomers of cyclopentadiene and methylcyclopentadiene in the monomer product fractionating zone, and purging residual higher-boiling hydrocarbons from the product fractionating zone to prevent build-up of $C_7$ and lower-boiling hydrocarbons in said cracking zone.

4. In cracking dimers and codimers of cyclopentadiene and methylcyclopentadiene in a concentrate thereof with close-boiling hydrocarbons in the $C_8$ to $C_{14}$ range, the improvement which comprises cracking said dimers and codimers in a cracking zone under liquid phase conditions at temperatures in the range of 190° C. to 230° C., continuously removing vaporized cracked products with vaporized dimers and codimers of cyclopentadiene and methylcyclopentadiene from said cracking zone, passing the hydrocarbons removed as vapors from the cracking zone to an intermediate fractionation zone, maintaining temperatures in the range of 90° to 110° C. at the upper part of said intermediate fractionation zone to condense therein and reflux therein dimers and codimers of cyclopentadiene and methylcyclopentadiene while retaining $C_7$ to $C_9$ hydrocarbons in the vapor phase in a vapor stream taken overhead from said intermediate fractionation zone, returning a bottoms reflux containing the condensed dimers and codimers substantially freed of $C_7$ and low-boiling hydrocarbons to the cracking zone, distilling from the intermediate fractionation zone hydrocarbons in the $C_5$ to $C_9$ range, passing the distilled $C_5$ to $C_9$ hydrocarbons into a monomer product fractionation zone, distilling the $C_5$ and $C_6$ cyclopentadiene and methylcyclopentadiene monomers from said monomer product fractionation zone, heating residual hydrocarbons in the product fractionating zone to temperatures in the range of 110° to 180° C. to expel the $C_5$ and $C_6$ cyclopentadiene and methylcyclopentadiene monomers therefrom, and purging the residual $C_7$ and higher-boiling hydrocarbons from the monomer product fractionating zone to prevent return of the thus purged hydrocarbons to the cracking zone.

References Cited in the file of this patent

UNITED STATES PATENTS

| | | |
|---|---|---|
| 2,372,237 | Ward | Mar. 27, 1945 |
| 2,511,936 | Morrell et al. | June 20, 1950 |